United States Patent [19]

Salama et al.

[11] Patent Number: 4,595,311
[45] Date of Patent: Jun. 17, 1986

[54] STIFFENING FOR TUBULAR JOINTS

[75] Inventors: Mamdouh M. Salama, Ponca City, Okla.; Robert B. Pan, Calgary, Canada

[73] Assignee: Conoco Inc., Ponca City, Okla.

[21] Appl. No.: 523,239

[22] Filed: Aug. 15, 1983

[51] Int. Cl.[4] .............................................. F16B 11/00
[52] U.S. Cl. ..................................... 403/271; 403/170; 403/174; 403/237; 403/403; 405/203; 52/655
[58] Field of Search ............... 403/271, 272, 346, 347, 403/170, 178, 174, 237, 403, 230; 405/203, 205, 206, 207; 138/172; 52/655; 29/447

[56] References Cited

U.S. PATENT DOCUMENTS

| | | | |
|---|---|---|---|
| 2,150,651 | 3/1939 | Ewing | 403/272 X |
| 3,497,245 | 2/1970 | Metzger | 403/347 X |
| 3,776,253 | 12/1973 | Yamaguchi | 138/109 |
| 3,779,656 | 12/1973 | Guy et al. | 403/174 |
| 3,989,396 | 11/1976 | Matsumoto et al. | 403/174 |
| 4,130,303 | 12/1978 | George | 285/137 R |
| 4,466,600 | 8/1984 | Tuttle | 403/347 X |

Primary Examiner—Cornelius J. Husar
Assistant Examiner—Joseph A. Fischetti
Attorney, Agent, or Firm—Stephen A. Littlefield

[57] ABSTRACT

A tubular reinforcing member having end surfaces which conform to the cylindrical inner surface of a tubular chord member are positioned within the tubular chord member at the intersection of a bracing member. The longitudinal axis of the tubular reinforcing member is positioned so as to be coincident with the longitudinal axis of the intersecting bracing member. The use of the internal tubular reinforcing member constitutes an improvement over the commonly used stiffening rings in the direct translation of tensional and compression forces acting along a bracing member is transferred to a portion of the wall of the chord member opposite to that to which the bracing member is attached.

7 Claims, 4 Drawing Figures

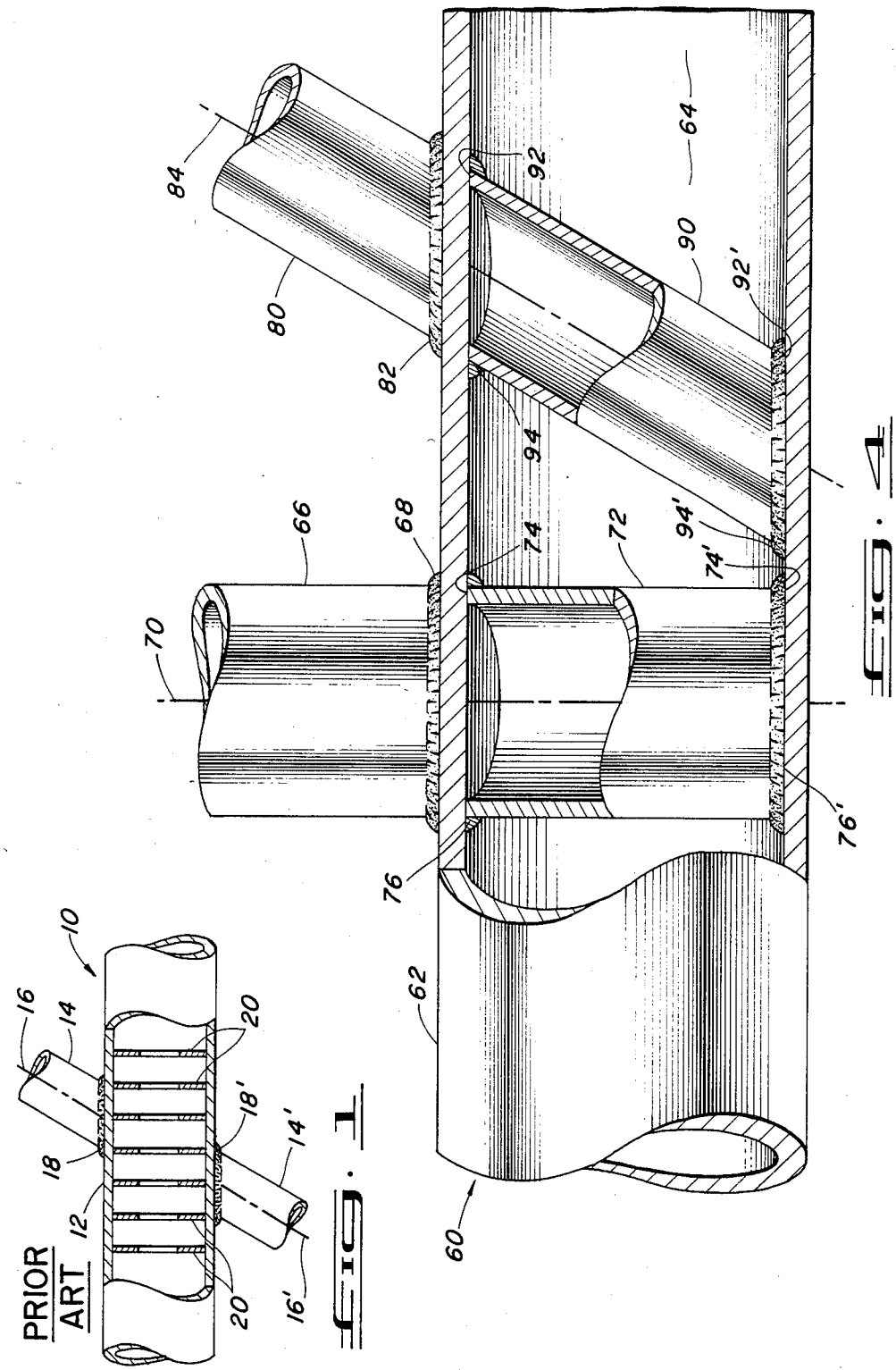

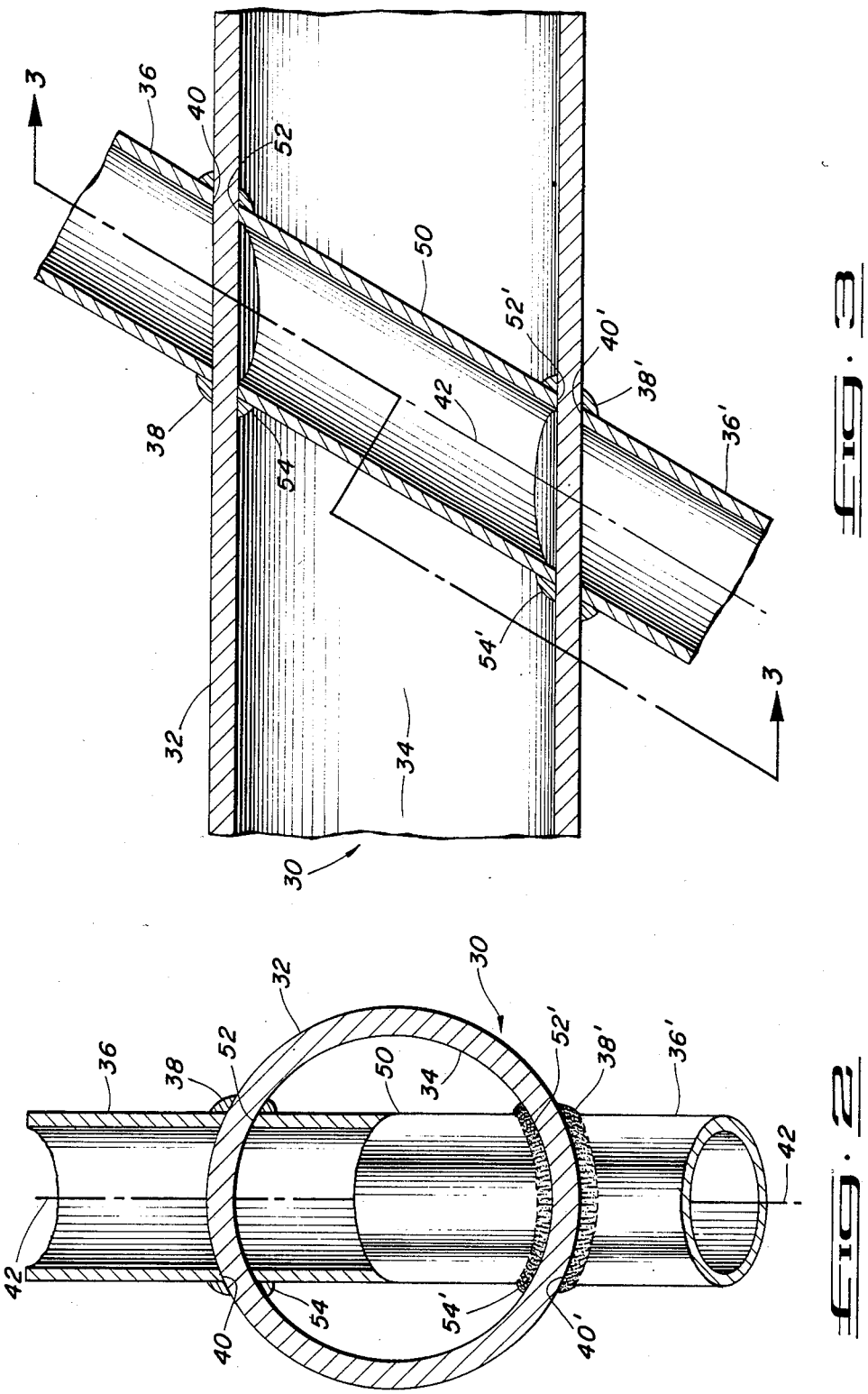

STIFFENING FOR TUBULAR JOINTS

This invention relates to the art of stiffening of tubular structural components and, more particularly, to a system of internally reinforcing chord members of a large structure at the juncture of bracing members.

BACKGROUND OF THE INVENTION

Large diameter chord members employed in such structures as large towers and particularly offshore oil platform support jackets are subjected to a wide range of tensile and compressive stresses. Such stresses are particularly concentrated at points where bracing and crossing tubular members engage the side walls of the chords. At these points, tension and compression forces acting along the attached bracing members can act to buckle, punch or fatigue crack the side walls of the chord members. In the past, several means of internal reinforcement for the chord members have been employed. The overall effect of such reinforcing is to distribute tensile and compressive forces transmitted by bracing members over a larger area of the chord wall.

The most common reinforcing structure for chord members is a series of ring stiffeners welded to the inner and/or outer walls of the chord member in the area at and adjacent to the intersection of a bracing member. Commonly, several rings are employed at spaced intervals in the area of an intersection. The weight, complexity, and cost of the complicated, multistep welding process makes such a stiffening system a disagreeable choice. Further, the generally radially oriented reinforcing rings do not effectively distribute forces acting against the side wall of the chord structure when the bracing members intersect at an angle other than perpendicular to the chord wall such as in a so-called K- or X-joint.

U.S. Pat. No. 4,130,303, describes the reinforcement of a pipe cross fitting for interconnecting tubular structural members in which plate members are disposed diametrically across the internal diameter of the intersecting structures. Tension and compression forces are concentrated at the welds at which the small abuting areas of the plate members intersect with the chord walls.

U.S. Pat. No. 3,779,656, discloses an X-form intersection of tubular members in which four wedge shaped tubular segments are welded to flat intersecting plate members, the assembly being located at the intersection of the four tubular members to transfer axial loading along each of the tubular members through the joint.

U.S. Pat. No. 3,776,253 describes apparatus for preventing distortion of large diameter tubular members by the weight of other tubular members in a stacked arrangement. Crossing wooden beams are wedged perpendicularly into an engagement with the inner walls of the tubular member to transfer weight loadings across the diameter of the tubular member. The weight loadings are thus concentrated at wooden beam locations for transference across the diameter of the tubular.

None of these foregoing prior art reinforcing systems effectively distributes tensile and compressive forces acting against the sidewalls of a chord member at an intersection with a bracing member of a complex joint. For the purposes of this specification, a complex joint is defined as an intersection of a chord and bracing member transverse to the major longitudinal axis of the chord member.

SUMMARY OF THE INVENTION

The present invention provides an internal stiffening means and method for reinforcing chord members against tensile and compressive forces acting at complex joints with intersecting bracing members.

In accordance with the invention, the joining of a tubular chord member having a first diameter and cylindrical inner and outer surfaces and at least one bracing member having a second diameter smaller than the first diameter and a longitudinal axis is internally reinforced by an internal tubular reinforcing member. The internal tubular reinforcing member has a longitudinal axis which is coincident with the longitudinal axis of the attached bracing member and has a pair of opposing end surfaces which are in abutment against the inner surface of the chord member.

Further in accordance with the invention, the tubular internal reinforcing member has a diameter substantially equal to the diameter of the intersecting bracing member.

Further in accordance with the invention, the opposed end surfaces of the internal reinforcing member are welded to the inner surface of the chord member.

Still further in accordance with the invention, a method of reinforcing the joint of a bracing member attached to the outer surface of a chord member having an inner surface comprises the steps of providing a tubular reinforcing member having a diameter which is substantially equal to the diameter of the bracing member and includes a pair of opposed sinuous end surfaces which conform to the inner surface of the chord member and attaching the opposed sinuous end surfaces of the reinforcing member to the inner surface of the chord member with the longitudinal axis of the reinforcing member being coincident with the longitudinal axis of the bracing member.

It is therefore an object of this invention to provide a simple, lightweight reinforcing means for stiffening a joint between a chord member and an intersecting bracing member.

It is a further object of this invention to provide a method and means of reinforcing planar T-, Y-, K-, and X-type tubular joints.

BRIEF DESCRIPTION OF THE DRAWINGS

These and other objects of the invention are accomplished through the manner and form of the present invention to be described hereinafter in conjunction with the accompanying drawings forming a part of this specification and in which:

FIG. 1 shows the ring stiffening system which is commonly used in the prior art and which the present invention is intended to improve upon;

FIG. 2 is a cross sectional, side elevational view of an X-joint of a chord and bracing member showing the internal reinforcing means of the present invention;

FIG. 3 is a cross sectional view of the joints shown in FIG. 2 taken along lines 3—3 thereof; and FIG. 4 is a fragmentary, side elevational view of a K-joint also employing the internal reinforcing means of the present invention.

DETAILED DESCRIPTION OF THE PREFERRED EMBODIMENTS AND THE DRAWINGS

Referring now to the drawings wherein the showings are for the purposes of illustrating a preferred embodiment of the invention only and not for the purpose of limiting same, FIG. 1 shows a common, prior art means of internally reinforcing chord members in the area of intersecting bracing members using reinforcing rings. A chord member 10 has attached to the outer surface 12 thereof a pair of crossing brace members 14, 14' having longitudinal axes 16, 16' which are conincident with each other on opposite sides of the outer surface 12 of the chord member 10. Weld beads 18, 18' attach the brace members 14, 14' to the outer surface 12 of the chord member 10.

In order to reinforce the chord member 10 against tensile and compressive stresses acting on the walls of the chord member 10 through the brace members 14, 14', a plurality of circular ring stiffeners 20 are welded internally of the chord member 10. It can be clearly seen that tensile and compressive forces acting along a perpendicularly intersecting brace member would be translated by the ring stiffeners 20 to the entire circumference of the chord member 10. This is not the case, however, with the brace members 14, 14' which form a complex joint with the chord member 10. Since the forces acting along the brace members 14, 14' are not radially disposed with respect to the longitudinal axis of the chord member 10, the radially disposed circular ring stiffeners 20 do not effectively distribute the forces acting along the brace members 14. For this reason, a great number of ring stiffeners 20 must be employed in order to reinforce the chord member 10 at the intersection of these brace members 14, 14'.

The improved method of reinforcing a similar X-joint in accordance with the present invention is shown in FIGS. 2 and 3. As with the prior embodiment shown in FIG. 1, a large diameter tubular chord member 30 has cylindrical outer and inner surfaces 32 and 34, respectively. A pair of colinear tubular bracing members 36, 36' of a smaller diameter than the large diameter chord member 30 are attached to the outer surface 32 of the chord member 30 by weld beads 38, 38'. As best shown in FIG. 3, the end portions 40, 40' of the tubular bracing members are shaped to conform to the shape of the outer surface 32 of the chord member 30 as is common in the art. The colinear tubular bracing members 36, 36' have a common longitudinal axis 42 passing through the tubular chord member 30.

In accordance with the present invention, a tubular reinforcing member 50 is positioned within the interior of the tubular chord member 30 and positioned so that its longitudinal axis is colinear with the longitudinal axis 42 of the tubular bracing members 36, 36'. The end surfaces 52, 52' of the tubular reinforcing member 50 are shaped to conform with the inner surface 34 of the tubular chord member 30 so that, in position within the tubular chord member 30, the tubular reinforcing member 50 has its end surfaces 52, 52' in abutment against the inner surface 34 of the chord member 30. Weld beads 54, 54' extend around the outer circumference of the end surfaces 52, 52' of the tubular reinforcing member 50 to attach same to the inner surface 34 of the tubular chord member 30. It will be understood that while welding of the tubular reinforcing member 50 is preferred, other means of securing the location of the tubular reinforcing member 50 in its proper position may be employed. Thus, shrink fitting, resistance welding or any other appropriate bonding method may be used to locate the tubular reinforcing member 50 in its desired position. It can be seen that tension and compression forces acting along the axis 42 of the tubular bracing members 36, 36' are transferred directly through the tubular chord member 30 resulting in a much more effective transfer of forces than is possible with a similar joint utilizing the prior ring-type stiffeners.

Referring now to FIG. 4, the concepts of the present invention are therein illustrated in conjunction with two differing bracing members which together form a K-joint or, independently, form a T- and a Y-joint. The concepts of the present invention are the same for all of the illustrated embodiments. A large diameter tubular chord member 60 having cylindrical outer and inner surfaces 62 and 64, respectively, has a perpendicularly intersecting tubular bracing member 66 attached to the outer surface 62 by a weld bead 68. The tubular bracing member 66 has a longitudinal axis 70 passing therethrough. In accordance with the present invention, a tubular reinforcing member 72 is positioned within the interior of the large diameter tubular chord member 60. The tubular reinforcing member 72 is positioned so that its longitudinal axis is colinear with the longitudinal axis 70 of the tubular bracing member 66. The end surfaces 74, 74' of the tubular reinforcing member 72 are shaped to conform with and be in abutment against the inner surface 64 of the tubular chord member 60. As with the previous embodiment, a weld bead 76, 76' extends circumferentially around the outer portion of the end surfaces 74, 74' of the tubular reinforcing member 72 to locate the tubular reinforcing member 72 in its desired position within the tubular chord member 60. As with the previous embodiment, location of the tubular reinforcing member 72 by welding is merely preferred and other, previously recited locating methods may be employed. It can be seen that tension and compression forces acting along the longitudinal axis 70 of the tubular bracing member 66 are transferred diametrically across the tubular chord member 60 so that the portion of the chord wall diametrically opposite to the portion of the wall to which the bracing member 66 is directly attached shares in the bearing of loadings acting on the bracing member 66. The assembly of chord member 60 with tubular bracing member 66 and tubular reinforcing member 72 illustrate the concepts of this invention in conjunction with a common T-joint.

FIG. 4 also illustrates the intersection of a diagionally intersecting bracing member 80 with the tubular chord member 60. As with other illustrated embodiments, the bracing member 80 is attached to the outer surface 62 of the tubular chord member 60 by a weld bead 82. Similarly, bracing member 80 has a longitudinal axis 84 passing therethrough.

Forces acting along the bracing member 80 against the tubular chord member 60 are transferred to a larger portion of the structure of the chord member 60 by an internal reinforcing tubular member 90 located within the interior of the chord member 60. As with previous embodiments in accordance with this invention, the tubular bracing member 90 has its longitudinal axis coincident with the longitudinal axis 84 of its associated bracing member 80. As with similar embodiments, the end surfaces 92, 92' of the tubular reinforcing member 90 are shaped to conform with the inner surface 64 of the tubular chord member 60 and be in abutment thereagainst. Again, as with previous embodiments, location of the reinforcing member 90 is secured by weld beads 94, 94' extending circumferentially around the outer edges of the end surfaces 92 of the reinforcing member 90.

When diagonally intersecting tubular bracing member 80 and the tubular chord member 60 are considered by themselves, it can be seen that a common, Y-joint is formed. Forces acting along the bracing member 80 are transferred by the coaxially-oriented tubular reinforcing member 90 to the portion of the wall of the chord member 60 which is opposite to the portion to which the bracing member 80 is directly attached. Thus, a greater portion of the wall surface of the tubular chord member 60 shares the load bearing function of forces acting along the bracing member 80.

When tubular chord member 60 and intersecting bracing members 66 and 80 are considered together as shown in the entirety of FIG. 4, the manner in which a common K-joint is reinforced in accordance with the invention is clearly illustrated.

The tubular reinforcing members 50, 72, 90 have been illustrated as having substantially the same diameter as its associated bracing member 36, 36', 66, 80. While this is preferred, it will be understood that the advantages of this invention may also be realized with the use of tubular reinforcing members having a smaller or a larger diameter than its associated bracing member. The important point being that the bracing and reinforcing members share a common longitudinal axis.

From the foregoing it can be clearly seen that the present invention provides an internal stiffening means for reinforcing chord members 30, 60 against tensile and compressive forces acting at joints with intersecting bracing members 36, 36', 66, 80.

It has been shown that in accordance with the invention, a joint of a tubular chord member 30, 60 having cylindrical outer and inner surfaces 32, 62 and 34, 64 respectively, and at least one intersecting bracing member 36, 36', 66, 80 having a longitudinal axis 42, 70, 84, the bracing member 36, 36', 66, 80 being attached to the outer surface 32, 62 of the chord member 30, 60 is reinforced by a tubular internal reinforcing member 50, 72, 90. Such tubular internal reinforcing member 50, 72, 90 has a longitudinal axis which is coincident with the longitudinal axis of the bracing members. Further, the internal reinforcing members have end surfaces 52, 52', 74, 74', 92, 92' which conform to and are in abutment against the inner surface 34, 64 of the chord member 30, 60.

It has further been shown that in accordance with the invention, a method of reinforcing the intersection of a tubular bracing member 36, 36', 66, 80 with a tubular chord member 30, 60 comprises providing a tubular reinforcing member 50, 72, 90 with end surfaces 52, 52', 74, 74', 92, 92' which conform to the inner surface 34, 64 of the tubular chord member 30, 60. The tubular reinforcing member 50, 72, 90 is positioned so that its longitudinal axis conforms with the longitudinal axis 42, 70, 84 of its associated bracing member and so that the end surfaces are in abutment against the inner surface of the tubular chord member. A position of the tubular reinforcing member 50, 72, 90 is then secured within the tubular chord member 30, 60 by any appropriate method such as by shrink fitting, welding or otherwise bonding within the chord member 30, 60.

While the invention has been described in the more limited aspects of the preferred embodiment thereof, other embodiments have been suggested and still others will occur to those skilled in the art upon the reading and understanding of the foregoing specification. It is intended that all such embodiments be included within the scope of this invention as limited only by the appended claims.

Having thus described our invention, we claim:

1. In a joint of a tubular chord member having a first diameter and cylindrical inner and outer surfaces and at least one cylindrical bracing member having a second diameter smaller than said first diameter and a longitudinal axis, said bracing member being attached to said outer surface of said chord member, the improvement which comprises a cylindrical tubular internal reinforcing member having a longitudinal axis coincident with said longitudinal axis of each said bracing member, said internal reinforcing member having end surfaces which substantially conform to and are in abutment with said inner surface of said chord member.

2. The improvement as set forth in claim 1 wherein said internal reinforcing member has a diameter substantially equal to said second diameter.

3. The improvement as set forth in claim 1 further including a pair of continuous weld beads extending between said internal reinforcing member and said inner surface of said chord member adjacent to said conforming end surfaces.

4. The improvement as set forth in claim 1 wherein said joint is a T-joint.

5. The improvement as set forth in claim 1 wherein said joint is a Y-type joint.

6. The improvement as set forth in claim 1 including a pair of bracing members having a common longitudinal axis and forming an X-joint.

7. The improvement as set forth in claim 1 including a pair of bracing members having intersecting longitudinal axes and forming a K-joint.

* * * * *